United States Patent [19]

Holm

[11] Patent Number: 4,626,803

[45] Date of Patent: Dec. 2, 1986

[54] APPARATUS FOR PROVIDING A CARRIER SIGNAL WITH TWO DIGITAL DATA STREAMS I-Q MODULATED THEREON

[75] Inventor: John R. Holm, Seattle, Wash.

[73] Assignee: General Electric Company, Schenectady, N.Y.

[21] Appl. No.: 814,359

[22] Filed: Dec. 30, 1985

[51] Int. Cl.⁴ .......................... H03C 3/02; H03K 7/06
[52] U.S. Cl. .............................. 332/9 R; 332/16 R; 332/21; 332/23 R; 375/44
[58] Field of Search ............ 332/9 R, 16 R, 21, 23 R; 375/44, 52, 67

[56] References Cited

U.S. PATENT DOCUMENTS 4,540,958 9/1985 Neyens et al. .................... 332/16 R Primary Examiner—Siegfried H. Grimm
Attorney, Agent, or Firm—Geoffrey H. Krauss; James C. Davis, Jr.; Marvin Snyder

[57] ABSTRACT

A digital I-Q modulator provides an analog signal at a desired frequency $\omega_1$ with in-phase I and quadrature-phase Q modulation sidebands provided responsive to different associated ones of in-phase I and quadrature-phase Q digital data streams, each having the same number N of data bits. A multiplexer alternatingly selects a different one of the data streams to provide a first N-bit-wide data signal during each of a successive multiplicity of time intervals of duration T essentially equal to the reciprocal of the carrier signal frequency $\omega_1$. The bits of the data signal are inverted to provide another data signal during every other one of a multiplicity of inversion time intervals of duration T/2, with each commencing at one of the beginning and midpoint of each time interval T. A single digital-to-analog converter (DAC) uses the sequentially inverted data stream to provide an analog signal having an amplitude substantially established by the digital value of the second data signal during each of another multiplicity of conversion time intervals of duration T/4, each commencing at one of the beginning and midpoint of each inversion time interval T/2. A bandpass filter, having a center frequency substantially equal to the carrier signal frequency F and a bandpass of at least twice the baseband signal bandwidth of the digital data streams effectively removes all frequency components except those of the desired modulation envelopes at the desired carrier frequency.

16 Claims, 16 Drawing Figures

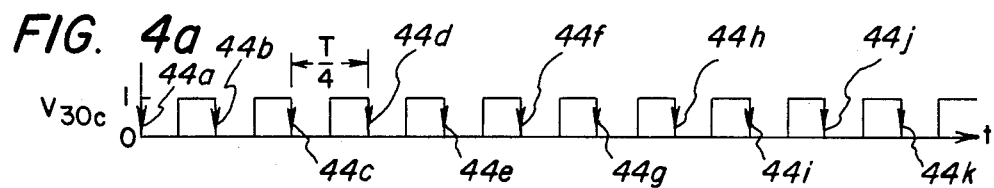
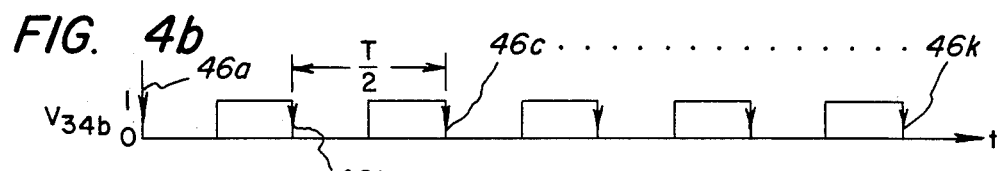
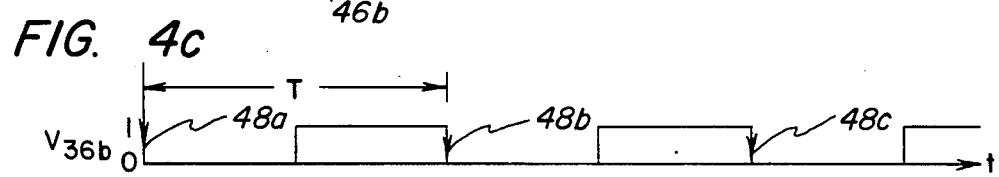
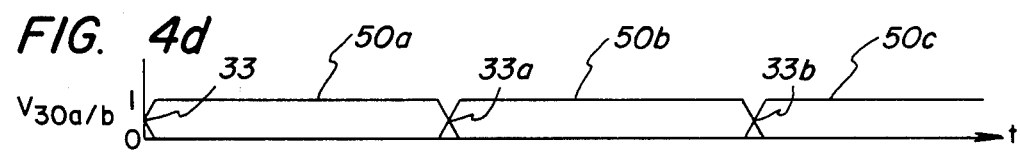
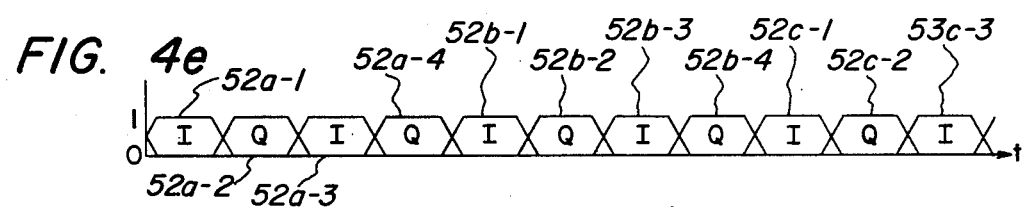
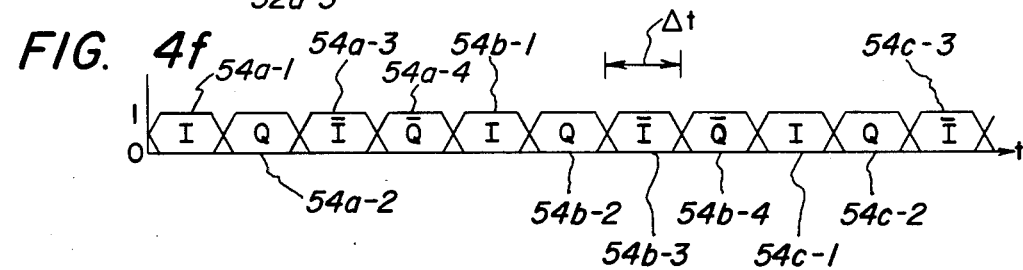

APPARATUS FOR PROVIDING A CARRIER SIGNAL WITH TWO DIGITAL DATA STREAMS I-Q MODULATED THEREON

BACKGROUND OF THE INVENTION

The present application relates to carrier modulation apparatus and, more particularly, to novel apparatus, utilizing a single digital-to-analog converter (DAC), for providing a carrier signal simultaneously modulated with both digital in-phase information and digital quadrature-phase information.

It is well known to transmit information-containing baseband signals, of either digital or analog nature, by the modulation of a carrier signal. The use of a modulator receiving two data streams, with the data of one stream being utilized to modulate an in-phase (I) component of the carrier signal and the second data stream being utilized to modulate a quadrature-phase (Q) component of the carrier signal, is also well known to the art. However, known implementations of such a I-Q modulator require the use of both analog and digital semiconductor circuitry upon the same circuit chip if one were to attempt to implement the I-Q modulator in a monolithically-integrated semiconductor circuit. As there are presently no relatively easy methods of fabricating both digital and analog components upon a semiconductor chip, especially in an integrated circuit of the very-large-scale-integration (VLSI) form, a highly integratable digital I-Q modulator is very desirable.

PRIOR ART

Hitherto, an I-Q modulator 1, as shown in FIG. 1, was implemented by converting the baseband waveforms of the digital I-Q data signals to an associated one of a pair of analog signals. Thus, the binary data stream for the in-phase I signal is provided to the digital data input port 2-1a of a first digital-to-analog converter (DAC) means 2-1, and the digital data stream for the quadrature-phase Q signal is provided to the digital data input port 2-2a of a second DAC means 2-2. Each of the resulting in-phase I analog signal at the first DAC means output 2-1b and the resulting Q analog signal at the second DAC means output 2-2b are respectively filtered by one of a substantially similar low pass filter means 3-1 or 3-2, respectively, to provide the time-varying baseband analog data signals I(t) and Q(t) at the first inputs 4-1a or 4-2a, respectively, of first or second multiplier means 4-1 or 4-2, respectively. Each of multiplier means 4 receives a carrier signal at a carrier input 4-1b or 4-2b, respectively, from the associated one of outputs 5a or 5b of a phase shift network 5. The carrier signal at output 5a has a phase of 0° with respect to the carrier signal provided at a network input 5c, from a carrier generating oscillator 6 and the like. The carrier signal at the second output 5b is provided at the same carrier frequency, but with a phase of 90° relative to the carrier frequency signal at output 5a. Each of the modulated quadrature-phase carrier signals appears at the respectively one of outputs 4-1c and 4-2c, for introduction at the associated one of inputs 8a or 8b, respectively, of an analog summer means 8. The summed modulated carrier signals appear at the summer means output 8c as the signal O(t) having the two streams of digital data modulated thereon as the quadrature-phased sidebands thereof.

In addition to the need for two digital-to-analog converter means 2, it will be readily apparent that, while the majority of modulator 1 is of analog nature, a major portion of the DAC means is of digital nature. This requires that any integrated circuit implementation of modulator 1 must be provided with analog and digital elements upon the same chip. In addition, fabrication techniques for analog components, such as double-balanced mixers (preferred for use as multipliers 4) and analog signal combiners of the type utilized for summer means 8, are not presently available for integrated circuit use, especially with as beneficial a set of desired characteristics as such components are available with in their physically-larger discrete forms. Further, because the signal at first modulation means carrier input 4-1b is of the form cos(ωt) and the signal at second modulation means carrier input 4-2b is of the form sin(ωt), the ideal output signal $O(t)=I(t)\cos(\omega t)+Q(t)\sin(\omega t)$ is not realized and a more realistic output signal O'(t) is of the form:

$$O'(t)=L\cos(\omega t+\theta)+I(t)\cos(\omega t)+kQ(t)\sin(\omega+\Phi),$$

where L and θ respectively represent the relative amplitude and phase of carrier signal leakage through the modulators and summer means, and k and Φ respectively represent gain mismatch and phase offset of one modulation means 4 with respect to the other. Thus, the modulator means imbalance, the imperfect phase quadrature between the carrier signals and the gain mismatch between the I and Q channels all act to degrade the quality of the modulation of the transmit carrier signal, resulting in an increased error rate at a receiver. It is therefore highly desirable to provide a I-Q modulator in which a pair of baseband digital data streams are directly converted to the modulation sidebands of a modulated carrier and in which a plurality of similar means (such as digital-to-analog converters, low pass filters, modulators and the like) are not required.

BRIEF SUMMARY OF THE INVENTION

In accordance with the invention, a digital I-Q modulator for providing an analog signal at a desired frequency $\omega_1$ and having in-phase I and quadrature-phase Q modulation sidebands thereof provided responsive to different associated ones of in-phase I and quadrature-phase Q digital data streams, each of the same number N of data bits, utilizes: means for alternatingly selecting a different one of the data streams to provide a first N-bit-wide data signal during each of a successive multiplicity of time intervals of duration T essentially equal to the reciprocal of the carrier signal frequency $\omega_1$; means for inverting the bits of the data signal to provide a second data signal during every other one of a multiplicity of inversion time intervals of duration T/2, each commencing at one of the beginning and midpoint of each time interval T; a single digital-to-analog converter (DAC) means for providing an analog signal having an amplitude substantially established by the digital value of the second data signal during each of another multiplicity of conversion time intervals of duration T/4, each commencing at one of the beginning and midpoint of each inversion time interval T/2; and a bandpass filter having a center frequency substantially equal to the carrier signal frequency $\omega_1$ and a bandpass of at least twice the baseband signal bandwidth of the digital data streams.

In a presently preferred embodiment, the selecting means is a N-bit-wide multiplexer for selecting one of the two input data streams as the first data signal; and the inverting means is a group of N two-input exclusive-OR gates, each having one input receiving a signal of substantially square waveform at one-half the frequency of a substantially square waveform signal applied to the input-selection input of the multiplexer, and receiving a different one of the N bits of the first signal at its other input. The N gate outputs provide the second data signal at the DAC means digital input port.

Accordingly, it is an object of the present invention to provide a novel I-Q modulator for directly converting a pair of different digital data baseband signals to a modulated analog carrier.

This and other objects of the present invention will become apparent upon reading of the following detailed description when considered in conjunction with the drawings.

BRIEF DESCRIPTION OF THE DRAWINGS

FIGS. 4a–4f are time-corrolated graphical illustrations of waveforms found at various locations within the modulator of FIG. 4, and useful in appreciating the operation thereof.

DETAILED DESCRIPTION OF THE INVENTION

Figure 1:
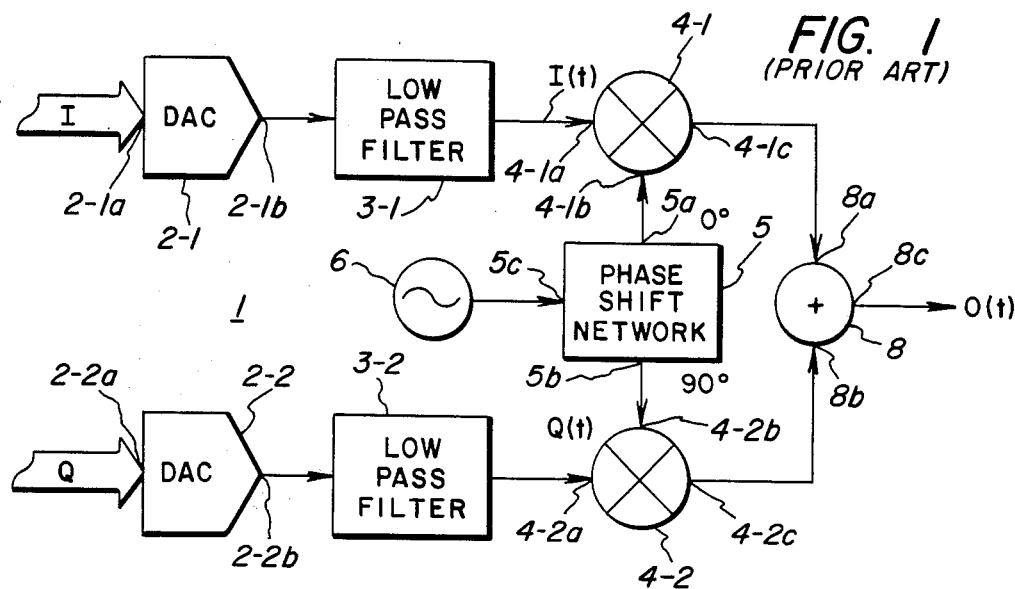
FIG. 1 is a schematic block diagram of a prior art I-Q modulator.
Figure 2A:
FIGS. 2a–2d are graphical representations of the frequency spectra, with like frequency values, respectively of a baseband I channel data stream, a sampling impulse train, the sampled I channel data and the modulated carrier output signal, as occur in a I-Q modulator of the present invention.
Figure 2B:
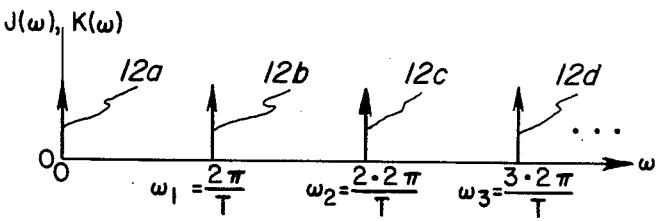

The principles of my novel digital I-Q modulator may be best discerned by referring initially to FIGS. 2a–2d, wherein the frequency $\omega(=2\pi F)$ is plotted with increasing value along the abscissae, for amplitudes plotted with increasing value along the ordinates. In accordance with one aspect of the invention, my modulator utilizes the similarity of sampling and harmonic mixing to produce a modulated carrier signal by bandpass filtering one of a plurality of similar spectra occurring at a frequency related to a desired multiple of the sampling rate. The I and Q data streams, which in the time domain are represented as band-limited baseband signals I(t) and Q(t), have a frequency-domain spectral envelope 11 with an amplitude A related to the difference in the high and low logic levels of the digital data streams (FIG. 2a). The spectra have substantially continuous frequency components up to some corner frequency $\omega_b$, with reduced spectral content to some practical upper frequency $\omega_m$. First and second, essentially identical sample impulse trains J(t) and K(t) can be provided, where $$J(t) = \sum_{n=-\infty}^{\infty} \delta(t - nT).$$

the resulting frequency domain impulse trains J($\omega$) and K($\omega$) (FIG. 2b) then each comprise a set of impulses 12a, ..., 12n, ... occurring at frequencies $\omega_p = 2\pi p/T$, where p=0,1,2,3, ... Thus, a zero-th (p=0) frequency-domain impulse 12a occurs at the essentially zero (DC) frequency, while a first (p=1) impulse 12b occurs at a first frequency $\omega_1 = 2\pi/T$, a second (p=2) impulse 12c occurs at a second frequency $\omega_2 = 4\pi/T$ (i.e. at twice the frequency $\omega_1$ of impulse 12b), a third (p=3) impulse 12c occurs at a third frequency $\omega_3 = 6\pi/T$ (i.e. at three times the frequency $\omega_1$ of impulse 12b), and so forth. When impulse train J(t) is used to sample the in-phase data stream signal I(t) and impulse train K(t) is used to sample the quadrature-phase data stream signal Q(t), the amplitude of each pulse of the resulting impulse train signals P(t) and R(t) is established by the then-present data bit, so that $$P(t) = \sum_{n=-\infty}^{\infty} I(t)\delta(t - nT)$$

and $$R(t) = \sum_{n=-\infty}^{\infty} Q(t)\delta(t - nT).$$

Figure 2C:
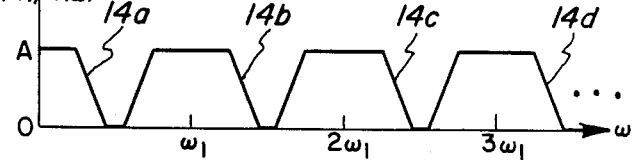
Figure 2D:
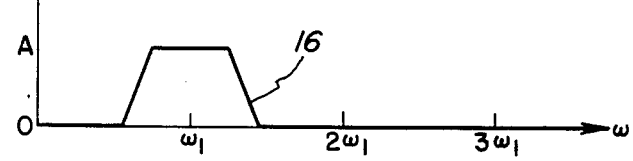

The frequency-domain spectra P($\omega$) and R($\omega$), in FIG. 2c, have components 14a, 14b, 14c, 14d, ... each having a center frequency $\omega_p$ set by the sampling pulse train time interval T, and sideband modulation envelopes established by the then-present frequency envelope 11 of the associated bandlimited baseband data signal I(t) or Q(t); the impulse train "maps" replicas of the data envelope to each one of the p-th multiples of the carrier signal frequency $\omega_1$. If a bandpass filter follows the means utilized for performing the sampling function, the baseband signal component 14a and the components 14c, 14d, ... (at multiples p of the desired carrier frequency $\omega_1$) can all be suppressed, so that only the desired modulated carrier frequency $\omega_1$ signal 16 (FIG. 2d) is available for transmission to a receiving end. However, as both data stream signals have been substantially simultaneously modulated onto the carrier signal without any form of phase shift therebetween, the modulation signals C($\omega$) and S($\omega$) are not in phase quadrature with one another and can not be separated at the receiving end.

In accordance with another aspect of my invention, the second baseband data stream Q(t) is sampled by a modified sampling signal K'(t), which has been delayed by one-quarter of the sampling time interval T, with respect to the first signal J(t) for sampling the in-phase data stream signal I(t); thus $$K'(t) = \sum_{n=-\infty}^{\infty} \delta(t - nT - T/4)$$

and the sampled signal R'(t) is now $$R'(t) = \sum_{n=-\infty}^{\infty} Q(t)\delta(t - nT - T/4).$$

The difference in sampling time is substantially equal to a one-quarter cycle delay in (or 90° phase shift of) the carrier component being generated; thus, the modified component S'(t) of the bandpass-filtered signal 16 is now S'(t)=Q(t)sin($\omega_1$t) and can be combined with C(t)=I(t)cos($\omega_1$t) to yield a quadrature-modulated carrier signal. This signal is the result, however, of sampling the the pair of data bit stream signals with a non-uniform sampling period, and is realized by what is still not the most desirable sampling process.

Figure 3A:
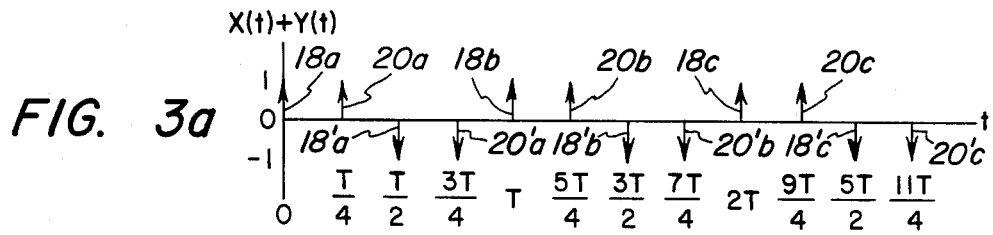
FIG. 3a is a graphical time-domain representation of the actual impulse train desired to be utilized in the preferred embodiment of my invention described herein.

Referring now to FIGS. 3a–3d, the final form of signal for sampling the pair of digital data streams uses the respective in-phase I(t) baseband component sampling signal X(t) and quadrature-phase Q(t) baseband component sampling signal Y(t) (shown as a composite X(t)+Y(t) sampling signal in FIG. 3a), where $$X(t) = \sum_{n=-\infty}^{\infty} \delta(t - nT) - \delta(t - nT - T/2)$$

and $$Y(t) = \sum_{n=-\infty}^{\infty} (t - nT - T/4) - \delta(t - nT - 3T/4).$$

Figure 3B:
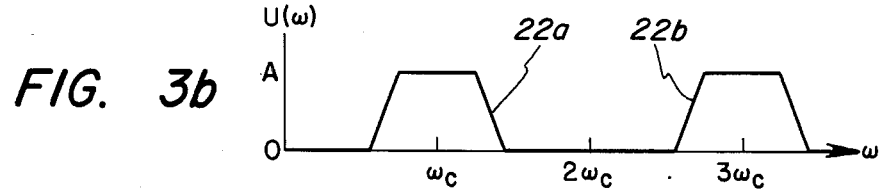
FIGS. 3b–3d are frequency-domain graphical representations of the time-shifted actual samples in preferred modulated embodiment.
Figure 3C:
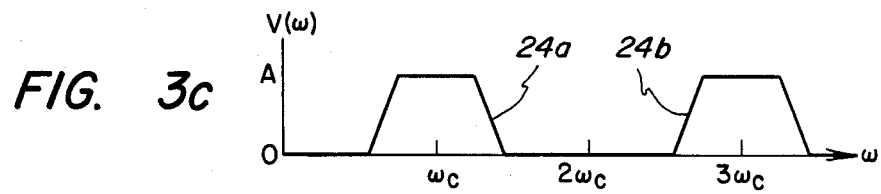
Figure 3D:
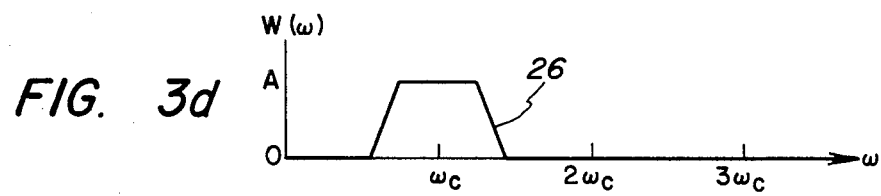
Figure 4:
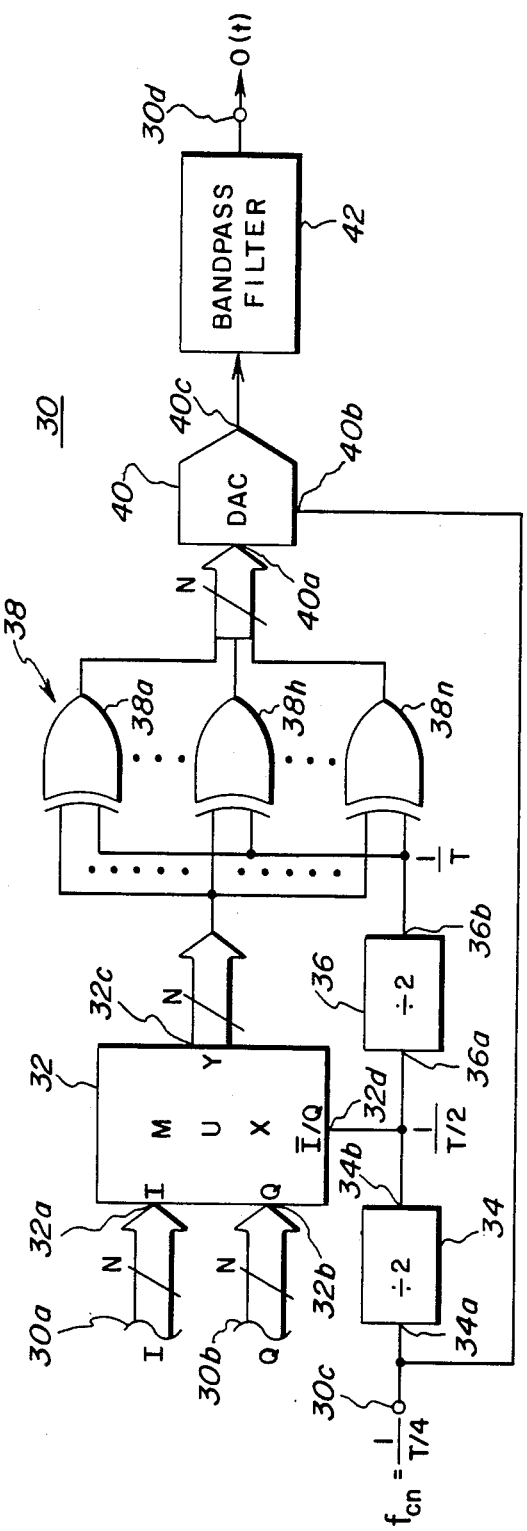
FIG. 4 is a schematic block diagram of the presently preferred embodiment of my novel modulator.

Thus, the in-phase I data signal is sampled twice during each time interval T, with a first-polarity (e.g. positive) sampling pulse 18a, 18b, 18c, . . . at the beginning time (pT) of each interval (e.g. at times O, T, 2T, . . . ) and with an opposite-polarity (e.g. negative) sampling pulse 18'a, 18'b, 18'c, . . . at the midpoint time (pT+T/2) of each interval (e.g. at times T/2, 3T/2, 5T/2, . . . ). The quadrature-phase Q data signal is also sampled twice during each time interval T, at times displaced by a 90° phase shift (i.e., a one-quarter time interval from the in-phase data stream sampling times, with the first-polarity (e.g. positive) sampling pulse 20a, 20b, 20c, . . . at the one-quarter time (pT+T/4) of each interval (e.g. at times T/4, 5T/4, 9T/4, . . . ) and with the opposite-polarity (e.g. negative) sampling pulse 20'a, 20'b, 20'c, . . . at the three-quarter time (pT+3T/4) of each interval (e.g. at times 3T/4, 7T/4, 11T/4, . . . ). The addition of these two uniformly-spaced sampling signals provides a total sampling signal which is not only also of uniform sampling interval (T/4), but which also suppresses the signals at even harmonics of the carrier frequency $\omega_c$ related to the sampling time T. As shown in FIG. 3b, the frequency spectrum U($\omega$) of the in-phase component sampled signal U(t) has a desired signal envelope 22a centered about carrier frequency $\omega_c$, a next-higher-frequency signal envelope 22b centered about the third harmonic 3$\omega_c$ of the desired carrier frequency, and other envelopes centered about still-higher odd harmonics. As shown in FIG. 3c, the frequency spectrum V($\omega$) of the quadrature-phase component sampled signal V(t) has a desired signal envelope 24a also centered about carrier frequency $\omega_c$, a next-higher-frequency signal envelope 24b also centered about the third harmonic 3$\omega_c$ of the desired carrier frequency, and, like spectrum U($\omega$), also has other envelopes centered about still-higher odd harmonics. Bandpass filtering of the additive result yields an output signal W(t) having a frequency spectrum W($\omega$) with a substantially-nonzero-amplitude envelope 26 (FIG. 3d) only about the desired carrier frequency $\omega_c$ and with all other frequency components attenuated to a desired degree. It will be seen that, because of the increased frequency separation between desired and undesired spectral components, the required filtering can be now provided with a less-expensive filtering means.

Referring now to FIGS. 4 and 4a–4f, the circuit and operation of a presently preferred embodiment 30 of my I-Q modulator will be explained. Circuit 30 receives an in-phase I data stream, of N bits, at a first modulator input port 30a for transmission to a first I data input port 32a of a multiplexer means 32. A quadrature-phase Q data stream, also of N bits, is received at a second modulator input port 30b for transmission to a second Q data input port 32b of the MUX means. Each word of the baseband data is held for a multiple of the time interval T, so that data changes can only occur at the beginning-/end 33, 33a, 33b, . . . of (one or more) sampling intervals; the data itself can be offset, twos-complement or the like coded binary signals, as desired for a particular use and as established by the coding of the particular DAC to be used. Similarly, the number N of data bits will also be dependent upon encoding scheme and hardware available. The MUX means 32 is a N-bit multiplexer, having the N bits of either input port 32a or input port 32b connected to a N-bit output port 32c responsive to the logic state of a selection signal at a control input 32d. For purposes of illustration only, MUX means 32 may connect the first I input port 32a to output port 32c responsive to a low logic level at input 32d, and may connect second Q input port 32b to output port 32c responsive to a high logic level at input 32d. A substantially square-wave logic signal, at a carrier frequency $f_{cn}$, (FIG. 4a) is externally supplied to a frequency-control input 30c of the modulator. The carrier control signal is applied to the input 34a of a first frequency divider means 34. Divider means 34 typically provides an output 34b signal (FIG. 4b) at one-half the input (carrier) frequency and with a substantially square waveform. The first divider means output signal is connected to MUX control input 32d, to cause the I and Q data streams (FIG. 4d) to be interleaved (FIG. 4e) at the MUX means output port. The first divider means signal is also applied to the input 36a of a second divider means 36. Means 36 is also typically a divide-by-2 means, with a signal (FIG. 4c) at its output 36b being provided at one-fourth the frequency at input 30c and with a substantially square waveform. Thus, the input carrier signal 44 has a frequency $f_{cn}=1/(T/4)$, so that the signal 46 at output 34b is at a frequency $f_{cn}/2=1/(T/2)$ and the signal 48 at output 36b is at a frequency $f_{cn}/4=1/T$, and all three signals have substantially aligned gating edges (e.g. falling edges 44a, 44b, 44c, . . . of signal 44, edges 46a, 46b, 46c, . . . of signal 46, and edges 48a, 48b, 48c, . . . of signal 48).

The 1/T signal is applied to one input of a N-bit controllable logic inverting means 38, receiving the N-bit-wide digital data stream (FIG. 4e) from the MUX means output port 32c. In the present example, means 38 comprises a plurality N of two-input exclusive-OR gates 38a–38n, each having a first input receiving the 1/T signal from second divider means output 36b and also receiving an associated different one of the N bit signals from the MUX means output port 32c. Therefore, the logic state of each bit of the N bit signal at the inverting means 38 output, and the digital data input port 40a of a single digital-to-analog converter (DAC) means 40, will be in a "true" (non-inverted) state during the approximately 50% of the time that the second divider means output signal is in a first logic state (e.g. a low logic level), and will be in a "false" (inverted)

state during the approximately 50% of the time that the second divider means output signal is in a second logic state (e.g. a high logic level).

The N-bit-wide data, composed of the interleaved I data stream portion 52a-1, 52a-3, 52a-5, ... and the and Q data stream portions 52a-2, 54a-4, ..., are inverted midway through each time interval T/2 when each is present to provide a sequential data stream 54 (FIG. 4f) to the digital data DAC input port 40a. Data stream 54 comprises, during each one of the sequential multiplicity of carrier-frequency time intervals T, a non-inverted data I portion 54a-1, 54b-1, 54c-1, ... and a non-inverted data Q portion 54a-2, 54b-2, 54c-2, ... followed by an inverted data I portion 54a-3, 54b-3, 54c-3, ... and an inverted data Q portion 54a-4, 54b-4, 54c-4, ... . This sampled data signal train is then converted responsive to receipt of a predetermined one of signal edges 44 appearing at a conversion control input 40b, to the amplitude of an analog signal at DAC means output 40c. Since the digital values of the interleaved streams are effectively held until the next successive connection of the particular data stream to the inversion means 38, at the end of the effective multiplexing time interval T, the inversion means serves to provide the required negative sampling impulses at the one-half and three-quarter times of each time interval T for quadrature-phase modulation. The sampling signal polarity inversion causes an opposite-polarity half-cycle of the analog signal output to occur in the latter half of each carrier signal time interval T. The DAC means output signal is frequency filtered in a bandpass filter means 42 and the resulting quadrature-phased carrier frequency signal is made available as the desired output signal O(t) at modulator output 30d.

While one presently-preferred embodiment of my novel apparatus, for providing a carrier signal with two digital data streams I-Q modulated thereon, is described herein in detail by way of illustration, many variations and modifications will now become apparent to the skilled in the art. It is my intent, therefore, to be limited only by the scope of the appending claims, and by the particular details and instrumentalities described by way of the illustrated embodiment of the invention.

What I claim is:

1. A digital I-Q modulator for providing an analog signal at a desired carrier signal frequency $\omega_1$ and having in-phase I and quadrature-phase Q modulation sidebands thereof respectively provided responsive to respective different ones of in-phase I and quadrature-phase Q baseband digital data stream signals, comprising:

means for alternatingly selecting a different one of the pair of data stream signals to provide a first data signal during each of a successive multiplicity of time intervals of duration T essentially equal to the reciprocal of the carrier signal frequency $\omega_1$;

means for inverting each bit of the first data signal during every other one of a multiplicity of successive inversion time intervals of duration T/2, each commencing at successive ones of the beginning and midpoint of each time interval T, to provide a second data signal;

a single digital-to-analog converter (DAC) means for converting said second data signal to an analog signal portion having an amplitude substantially established by the digital value of the second data signal during each of another multiplicity of successive conversion time intervals of duration T/4, each commencing at successive ones of the beginning and midpoint of each inversion time interval T/2; and a bandpass filter having a center frequency substantially equal to the carrier signal frequency $\omega_1$ and a passband of at least twice the bandwidth of the baseband digital data stream signals.

2. The modulator of claim 1, wherein each of the pair of data digital data stream signals is N bits wide.

3. The modulator of claim 2, wherein each of the first and second data signals are N-bit-wide signals.

4. The modulator of claim 3, wherein said DAC means performs each converting process responsive to a pre-selected portion of a first timing signal.

5. The apparatus of claim 4, wherein said selecting means comprises a N-bit-wide multiplexer for selecting one of the two data stream signals as the first data signal, responsive to a second timing signal being at an associated one of respective first and second levels.

6. The modulator of claim 5, further comprising means, receiving the first timing signals, for providing the second timing signal as a substantially square-waveform signal.

7. The modulator of claim 6, wherein said inverting means comprises N means each for providing a like bit of the second data signal respectively at first and second logic levels if an associated and different one of the N bits of the first data signal and a third timing signal having respective first and second states are respectively in the same and different logic states.

8. The modulator of claim 7, further comprising means, receiving the second timing signal, for providing the third timing signal as a substantially square-waveform signal.

9. The modulator of claim 8, wherein said third timing signal providing means comprises a divide-by-two circuit having an output and an input receiving the second timing signal, for providing the third timing signal at its output with a frequency essentially equal to one-half the frequency of the second timing signal.

10. The modulator of claim 9, wherein said second timing signal providing means comprises a divide-by-two circuit having an output and an input receiving the first timing signal, for providing the second timing signal at its output with a frequency essentially equal to one-half the frequency of the first timing signal.

11. The modulator of claim 10, wherein said first timing signal is a substantially square-waveform signal.

12. The modulator of claim 7, wherein each of said N means comprises a two-input exclusive-OR gate having a first input receiving said third timing signal, with each gate having a second input receiving one associated and different one of the N bits of each first data signal from said selecting means.

13. The modulator of claim 6, wherein said second timing signal providing means comprises a divide-by-two circuit having an output and an input receiving the first timing signal, for providing the second timing signal at its output with a frequency essentially equal to one-half the frequency of the first timing signal.

14. The modulator of claim 13, wherein said first timing signal is a substantially square-waveform signal.

15. A method for providing an analog signal at a desired carrier signal frequency $\omega_1$, having in-phase I and quadrature-phase Q modulation sidebands thereof respectively provided responsive to respective different ones of in-phase I and quadrature-phase Q baseband digital data stream signals, comprising the steps of:

sampling the I data stream signal at the beginning of each of a multiplicity of successive sampling time intervals of duration T, essentially equal to the reciprocal of the carrier signal frequency $\omega_1$, to provide a first sample signal;

sampling the Q data stream signal at a time delayed by one-quarter of the time interval T after the beginning of each of the multiplicity of successive time intervals at which the I data stream signal is sampled, to provide a second sample signal;

combining the first and second sample signals, in the time domain, to provide a combined signal; and filtering the combined signal to include spectral energy substantially limited to a frequency band having a center frequency substantially equal to the carrier signal frequency $\omega_1$ and a passband of at least twice the bandwidth of the baseband digital data stream signals.

16. The method of claim 15, further including the steps of:

sampling the I data stream signal also at each of a like multiplicity of successive sampling times each delayed by one-half the time interval T from the beginning of an associated I signal sampling time interval;

sampling the Q data stream signal beginning also at each of a like multiplicity of successive sampling times each delayed by three-quarters the time interval T from the beginning of said associated sampling time interval;

inverting the data bits of the resulting I and Q sample signals, taken at the one-half and three-quarter times of each of the sample time intervals T, to provide an inverted sample signal; and combining the inverted sample signal, in the time domain, with the combined first and second sample signals, prior to filtering.

* * * * *